United States Patent
Lambertson, Jr. et al.

(10) Patent No.: US 9,127,703 B2
(45) Date of Patent: Sep. 8, 2015

(54) EXTENSION POLE MECHANISM FOR PAINT ROLLER

(71) Applicant: The Sherwin-Williams Company, Cleveland, OH (US)

(72) Inventors: Michael C. Lambertson, Jr., Aurora, OH (US); Rita Forman-House, Avon Lake, OH (US); Dennis P. De Renzo, Jr., Concord Township, OH (US); Michael O'Banion, West Minister, MD (US)

(73) Assignee: THE SHERWIN-WILLIAMS COMPANY, Cleveland, OH (US)

( * ) Notice: Subject to any disclaimer, the term of this patent is extended or adjusted under 35 U.S.C. 154(b) by 306 days.

(21) Appl. No.: 13/835,302

(22) Filed: Mar. 15, 2013

(65) Prior Publication Data
US 2014/0298633 A1 Oct. 9, 2014

(51) Int. Cl.
*F16B 7/10* (2006.01)
*F16B 7/14* (2006.01)
*B05C 17/02* (2006.01)
*B25G 1/04* (2006.01)

(52) U.S. Cl.
CPC ........... *F16B 7/1409* (2013.01); *B05C 17/0205* (2013.01); *B25G 1/04* (2013.01); *Y10T 29/49716* (2015.01); *Y10T 403/20* (2015.01); *Y10T 403/32467* (2015.01)

(58) Field of Classification Search
CPC ........ F16B 7/04; F16B 7/0406; F16B 7/0413; F16B 7/042; F16B 7/0426; F16B 7/1436; F16B 7/1427
USPC ................ 294/174, 210, 168, 30; 403/109.1, 403/109.5, 109.2
See application file for complete search history.

(56) References Cited

U.S. PATENT DOCUMENTS

| | | | | |
|---|---|---|---|---|
| 2,517,700 A * | 8/1950 | Odin | ............................ | 403/351 |
| 2,871,044 A * | 1/1959 | Peterson et al. | .............. | 403/352 |
| 2,942,900 A * | 6/1960 | Brucker | ........................ | 403/350 |
| 2,992,026 A * | 7/1961 | Farber | ........................... | 403/351 |
| 3,596,946 A * | 8/1971 | Burton et al. | .............. | 403/109.5 |
| 3,762,058 A * | 10/1973 | Heater | ............................. | 33/809 |
| 4,464,078 A * | 8/1984 | Vorobyov | ..................... | 403/351 |
| 4,662,771 A * | 5/1987 | Roe et al. | ...................... | 403/108 |
| 6,311,368 B1 * | 11/2001 | Sartori | ........................... | 16/429 |

* cited by examiner

*Primary Examiner* — Jason L Vaughan
(74) *Attorney, Agent, or Firm* — Daniel A. Sherwin; Vivien Y. Tsang; Deron A. Cook

(57) ABSTRACT

An extendable pole mechanism may be used with a pair of poles that are longitudinally movable to adjust the overall length of both poles. The mechanism may include a collar that receives the poles and a roller sleeve that rotates with respect to the collar to adjust the mechanism between a use condition, where the poles are held in a longitudinally relative fixed position, and an adjustment condition, where the poles are longitudinally moveable with respect to each other.

20 Claims, 17 Drawing Sheets

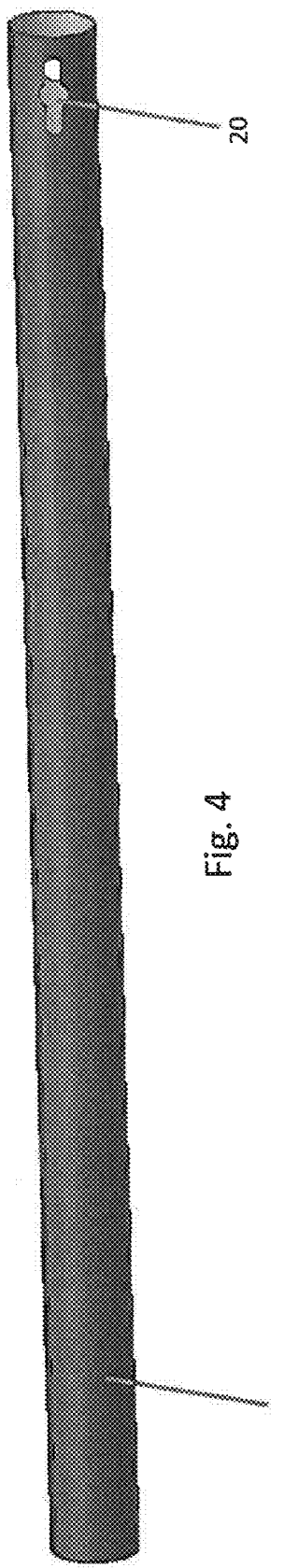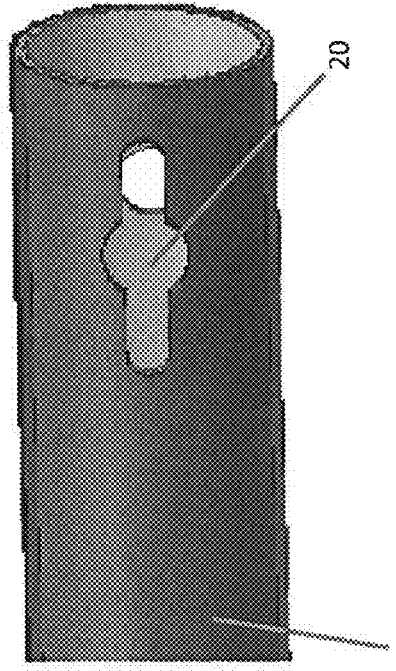
Fig. 4
Fig. 5

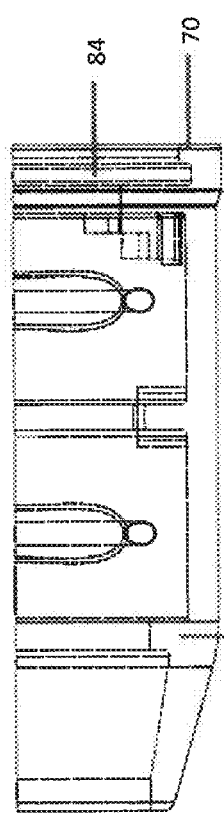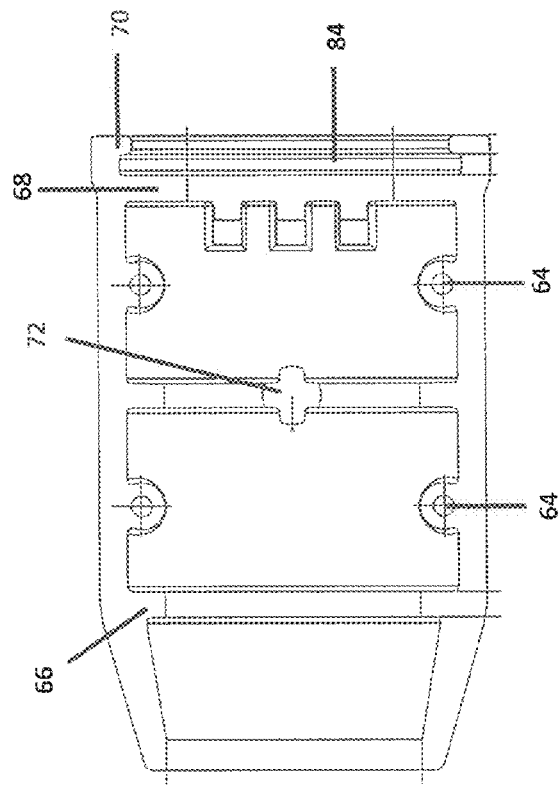

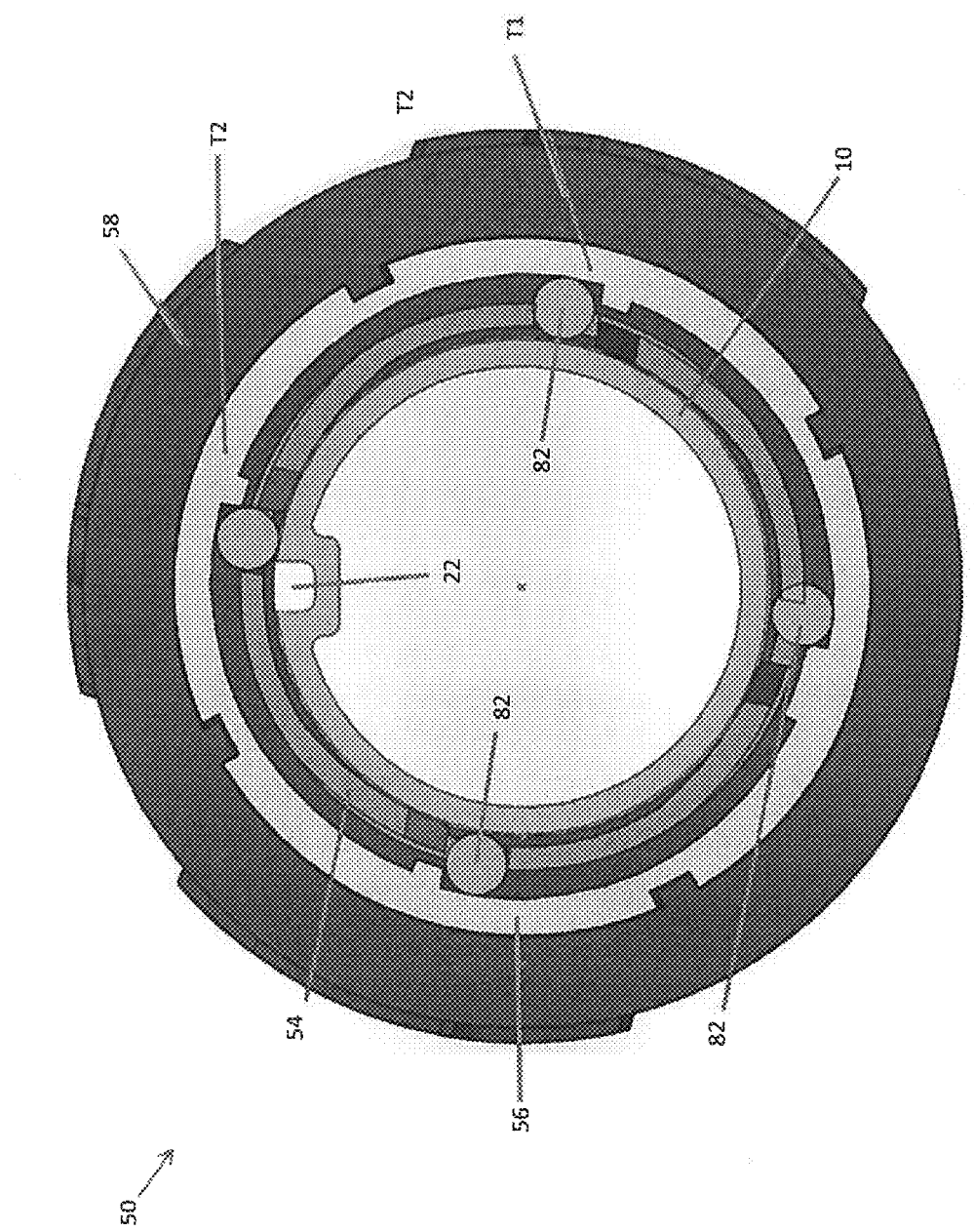

EXTENSION POLE MECHANISM FOR PAINT ROLLER

I. BACKGROUND

A. Field of the Invention

This invention is in the field of methods and apparatuses for extending and contracting the length of poles used with paint related accessories and more specifically to methods and apparatuses for an extendable pole mechanism that is easily adjusted between a use condition and an adjustment condition.

B. Description of Related Art

It is well known in the paint industry to provide adjustable length poles that are designed to connect to and disconnect from paint accessories. A painter, for example, requires the pole holding a paint roller to be at a relatively shorter length when painting a surface at waist height but to be at a relatively longer length when painting a surface far above his/her head. Known adjustable length poles, however, have disadvantages.

One disadvantage to known adjustable length poles is that they are difficult and time consuming to use. Another disadvantage is that they easily come "loose" from their setting, causing the poles to change their length when such change is not desirable. Yet another disadvantage is that many adjustable length poles are only adjustable in discrete length increments. Still another disadvantage is that known adjustable length poles quickly wear out, increasing costs.

What is needed, then, is an extendable pole mechanism that eliminates or reduces the disadvantages just described. Painters would benefit from using an extendable pole mechanism that is durable, remains in its setting, provides infinite length adjustment, and can be easily operated.

II. SUMMARY

According to one embodiment of this invention, an extendable pole mechanism may be used with a first associated pole that is longitudinally movable with respect to a second. associated pole to adjust the overall length of both poles. The extendable pole mechanism may comprise: a collar that: (1) receives the first and second associated poles; and, (2) contacts the second associated pole to prevent substantial relative longitudinal motion of the second pole with respect to the collar; a roller cage that: (1) has at least one roller; (2) receives the first associated pole; and, (3) is rotatable with respect to the first associated pole; and, a roller sleeve that: (1) receives the roller cage; (2) is rotatable with respect to the roller cage; (3) is attached to the collar; and, (4) is rotatable with respect to the collar. The extendable pole mechanism may be adjustable by rotating the roller sleeve with respect to the collar and with respect to the roller cage between: (1) a use condition where the first associated pole is held by contact with the at least one roller in a longitudinally substantially fixed position with respect to the second associated pole; and, (2) an adjustment condition where: (a) the first associated pole is not held by contact with the at least one roller in a longitudinally substantially fixed position with respect to the second associated pole; and, (b) the first associated pole is longitudinally moveable with respect to the second associated pole.

According to another embodiment of this invention, a method may comprise the steps of: (A) providing a first pole that is longitudinally movable with respect to a second pole to adjust the overall length of both poles; (B) providing an extendable pole mechanism comprising: (a) a collar that: (1) receives the first and second associated poles; and, (2) contacts the second associated pole to prevent substantial relative longitudinal motion of the second pole with respect to the collar; (b) a roller cage that: (1) has at least one roller; (2) receives the first associated pole; and, (3) is rotatable with respect to the first associated pole; and, (c) a roller sleeve that: (1) receives the roller cage; (2) is rotatable with respect to the roller cage; (3) is attached to the collar; and, (4) is rotatable with respect to the collar; and, (C) adjusting the extendable pole mechanism, by rotating the roller sleeve with respect to the collar and with respect to the roller cage, between: (1) a use condition where the first pole is held by contact with the at least one roller in a longitudinally substantially fixed position with respect to the second pole; and, (2) an adjustment condition where: (a) the first pole is not held by contact with the at least one roller in a longitudinally substantially fixed position with respect to the second pole; and, (b) the first pole is longitudinally moveable with respect to the second associated pole.

According to yet another embodiment of this invention, an extendable pole mechanism may comprise: a first pole and a second pole, wherein the first pole is longitudinally movable with respect to the second pole to adjust the overall length of both poles; a collar that: (1) has an open longitudinal center that receives the first and second poles; and, (2) contacts the second pole to prevent substantial relative longitudinal motion of the second pole with respect to the collar; a roller cage that: (1) has at least one roller; (2) has an open longitudinal center that receives the first pole; and, (3) is rotatable with respect to the first pole; and, a roller sleeve that: (1) has an open longitudinal center that receives the roller cage; (2) is rotatable with respect to the roller cage; (3) is attached to the collar; (4) comprises a ramp; and, (5) is rotatable with respect to the collar. The extendable pole mechanism may be adjustable by rotating the roller sleeve with respect to the collar and with respect to the roller cage between; (1) a use condition where the first pole is held by contact with the at least one roller in a longitudinally substantially fixed position with respect to the second pole; and, (2) an adjustment condition where: (a) the first pole is not held by contact with the at least one roller in a longitudinally substantially fixed position with respect to the second pole; and, (b) the first pole is longitudinally moveable with respect to the second pole. The at least one roller may roll along the ramp as the roller sleeve is rotated with respect to the roller cage in a first direction to tighten a force between the roller and the first pole to adjust the extendable pole mechanism from the adjustment condition into the use condition. The at least one roller may roll along the ramp as the roller sleeve is rotated with respect to the roller cage in a second direction that is opposite the first direction to loosen the force between the roller and the first pole to adjust the extendable pole mechanism from the use condition into the adjustment condition.

Numerous benefits and advantages of this invention will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 4 is side perspective view of a pole.

FIG. 5 is a close-up view of an end of the pole shown in FIG. 4.

FIG. 9 is a side view of the collar portion shown in FIG. 8.

FIG. 10 is a top view of the collar portion shown in FIG. 8.

FIG. 20 is an isometric exploded end view of the extendable pole mechanism shown in FIG. 2.

IV. DETAILED DESCRIPTION

Figure 1:
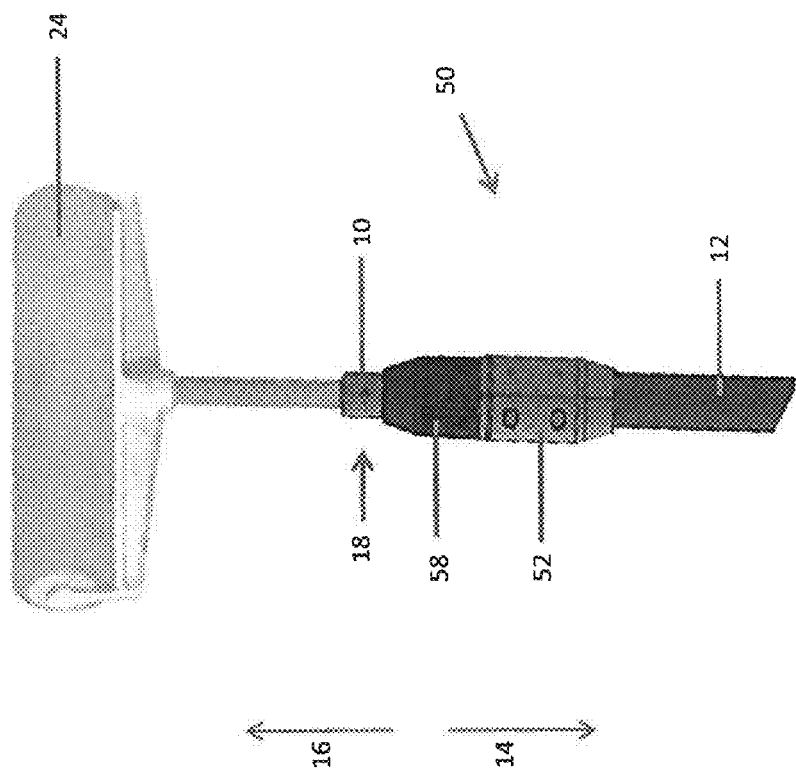
FIG. 1 is a side view of an extendable pole mechanism connected to a paint roller according to some embodiments of this invention.
Figure 2:
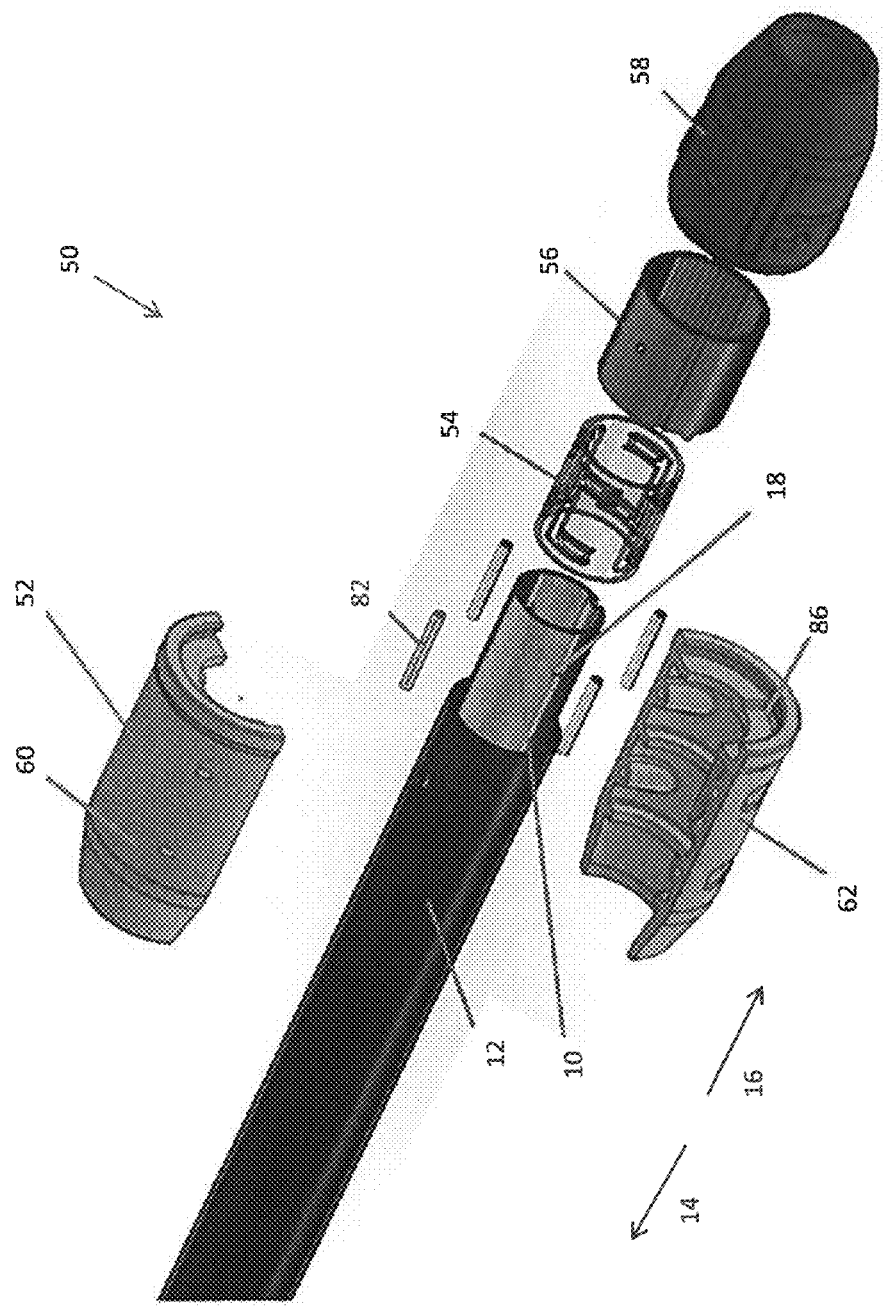
FIG. 2 is an assembly view of the extendable pole mechanism shown in FIG. 1.
Figure 3:
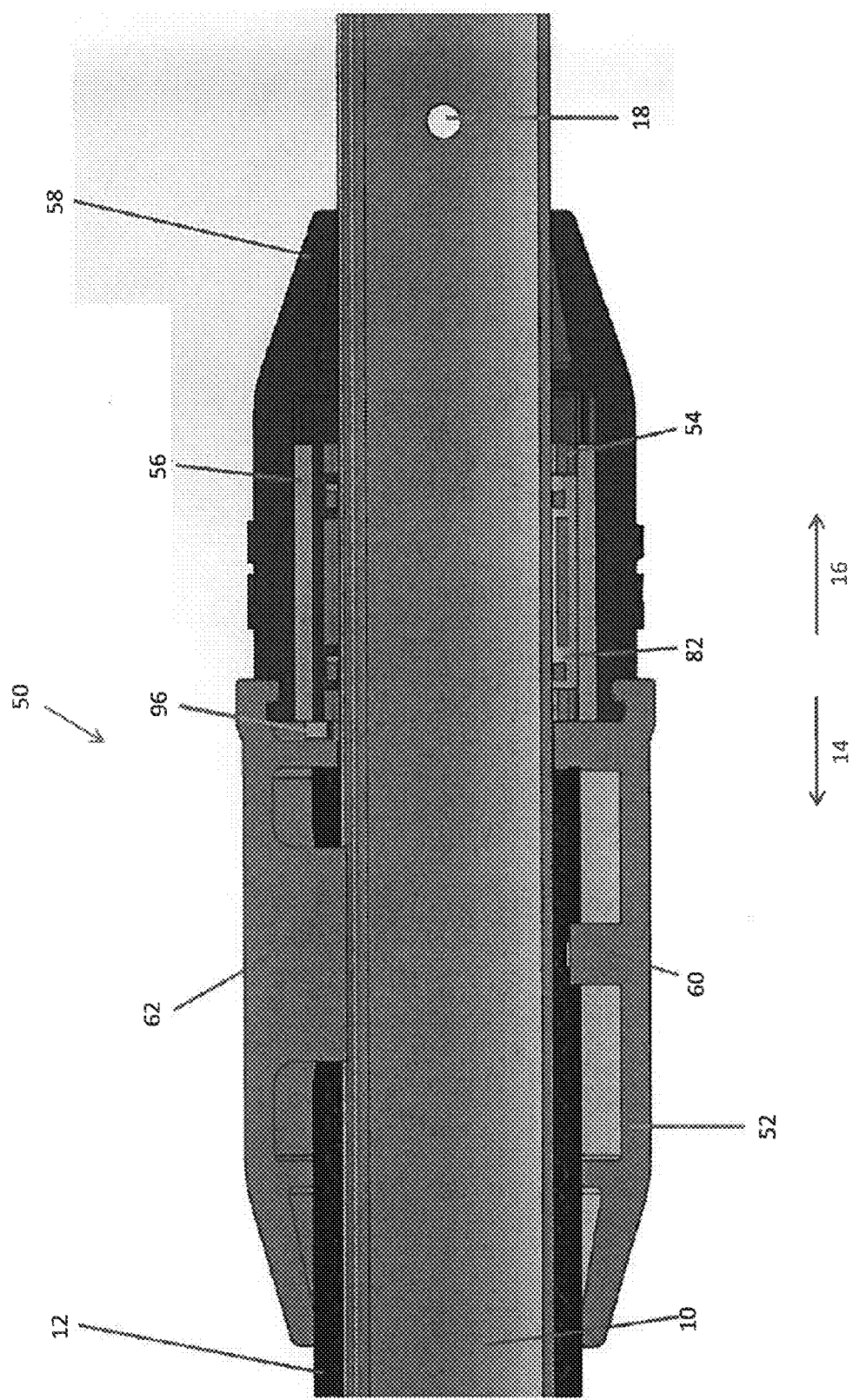
FIG. 3 is a sectional view of the extendable pole mechanism shown in FIG. 2.
Figure 6:
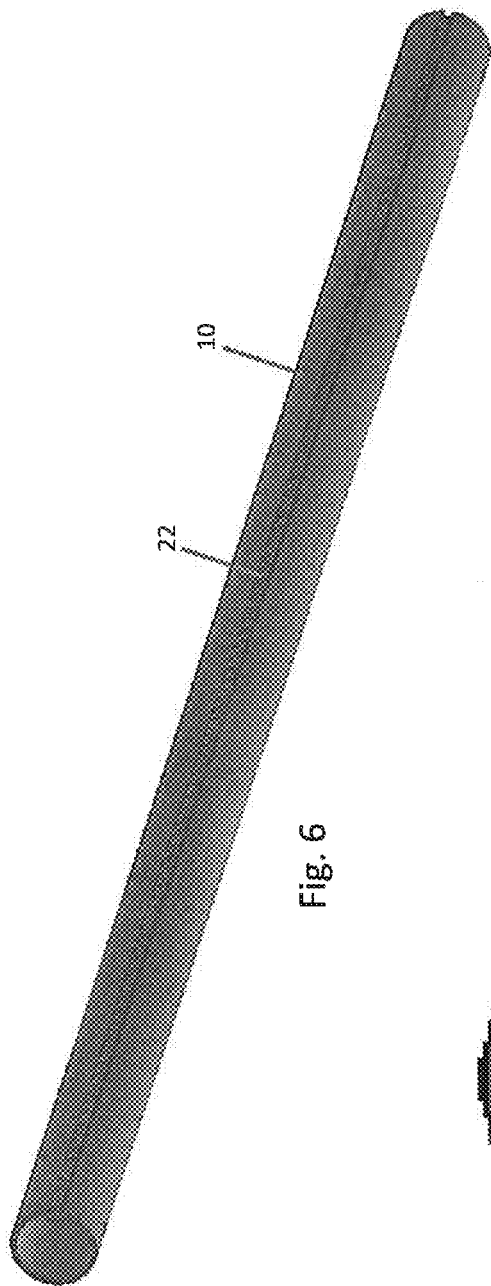
FIG. 6 is side perspective view of another pole.
Figure 7:
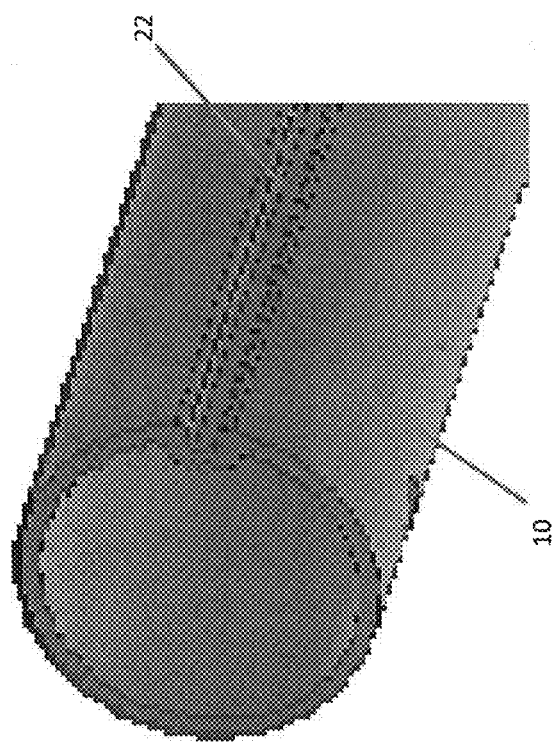
FIG. 7 is a close-up view of an end of the pole shown in FIG. 6.
Figure 8:
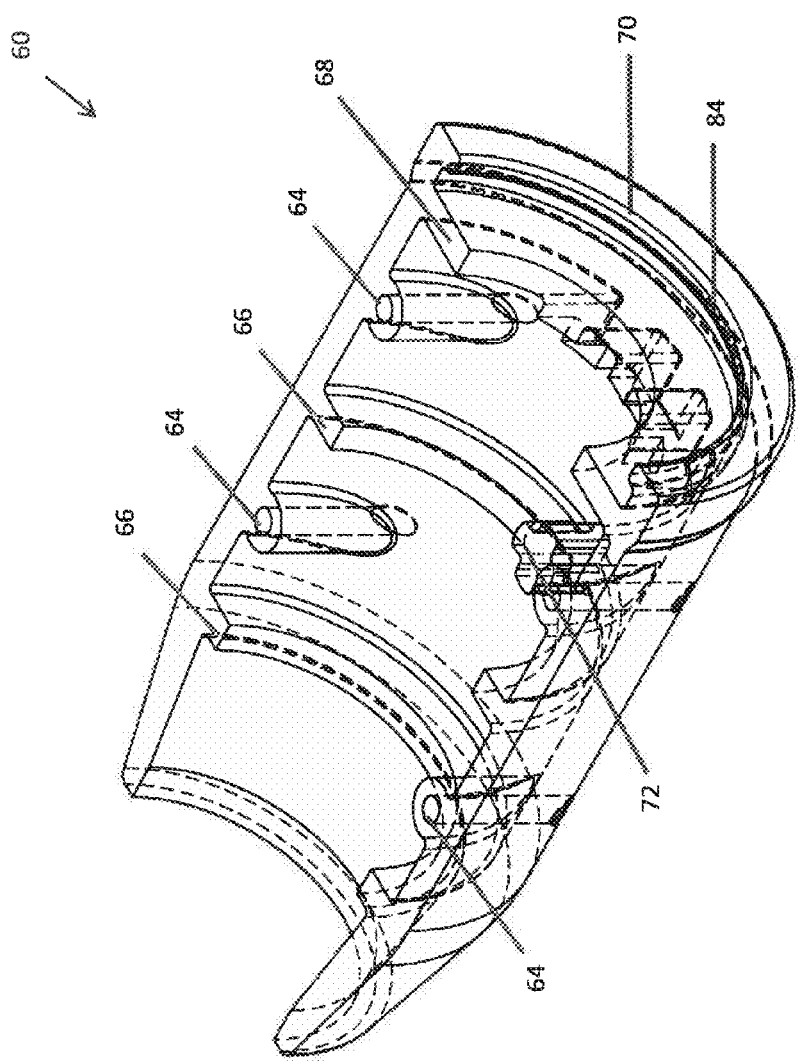
FIG. 8 is a top perspective view of a first portion of a collar.
Figure 11:
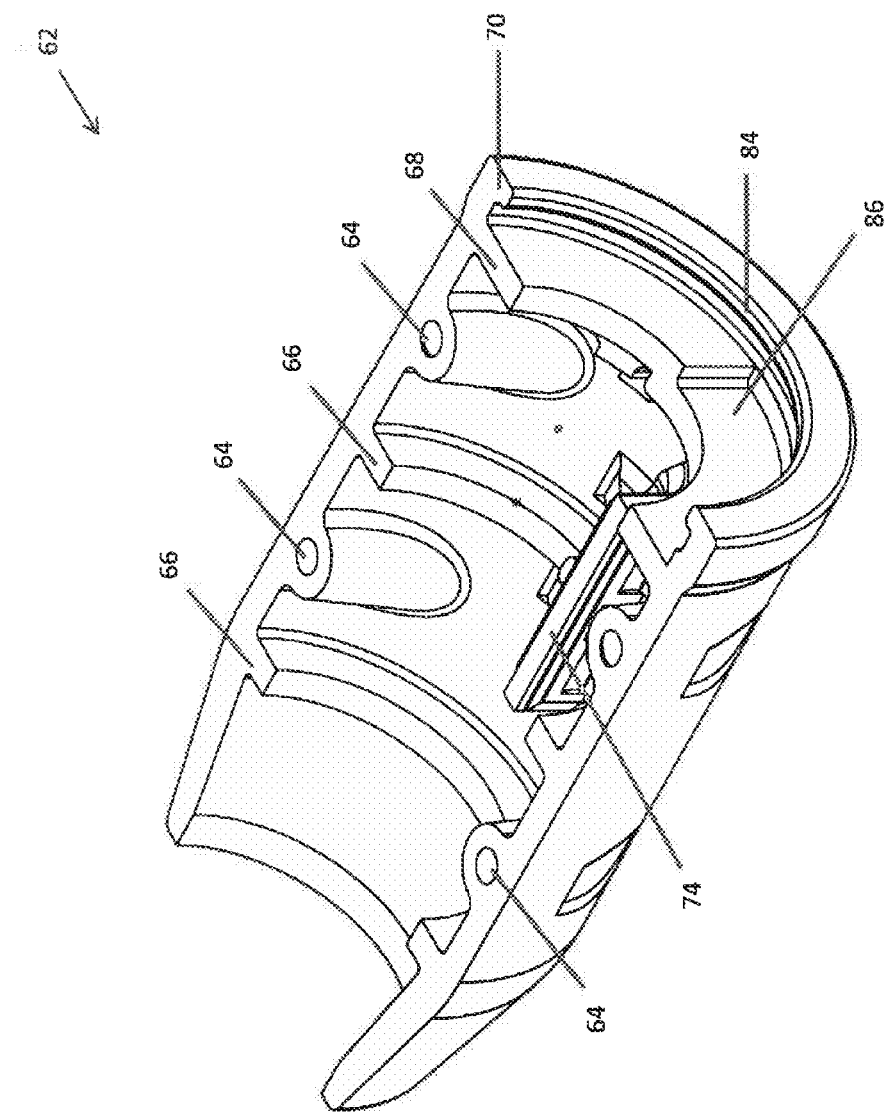
FIG. 11 is a top perspective view of a second portion of a collar.
Figure 12:
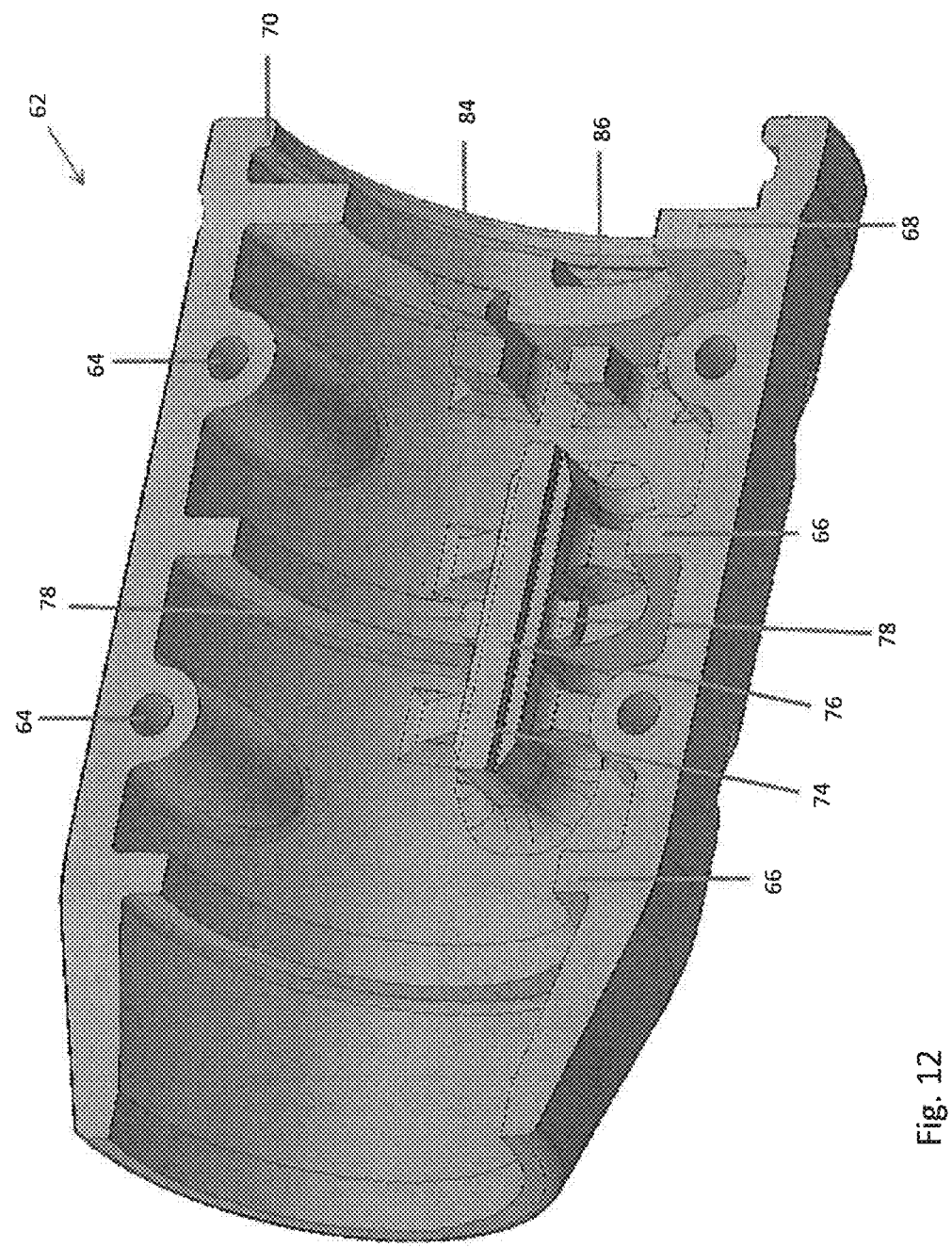
FIG. 12 is a top perspective view from a different angle of the collar portion shown in FIG. 11.
Figure 13:
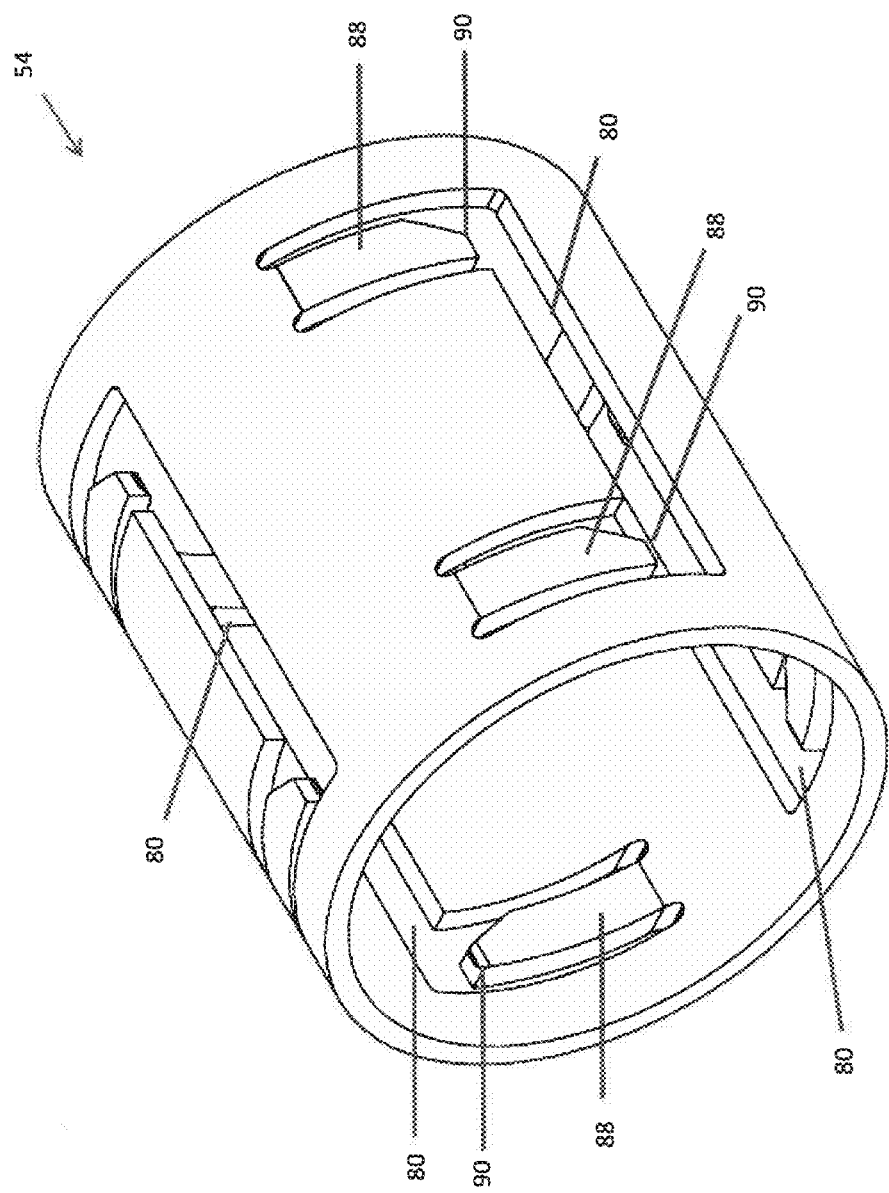
FIG. 13 is a perspective view of a roller cage.
Figure 14:
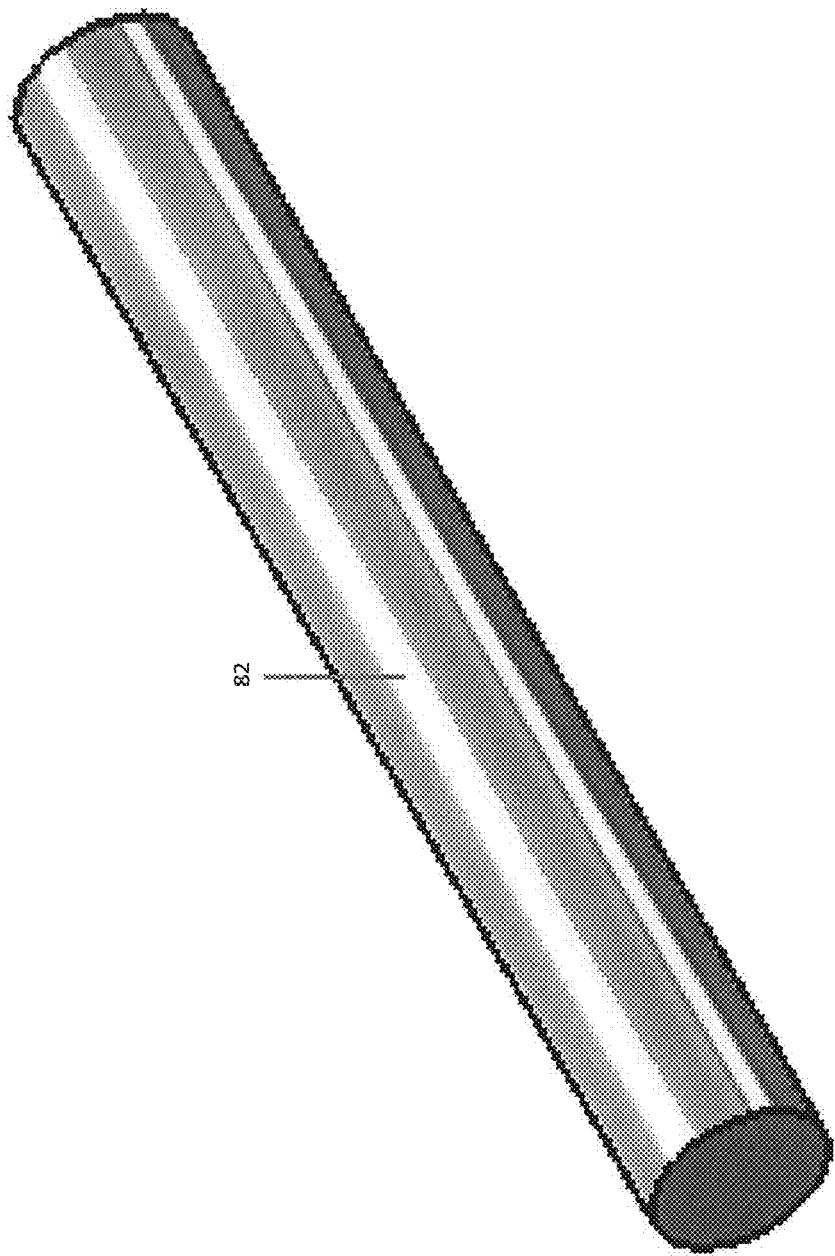
FIG. 14 is a perspective view of a roller pin.
Figure 15:
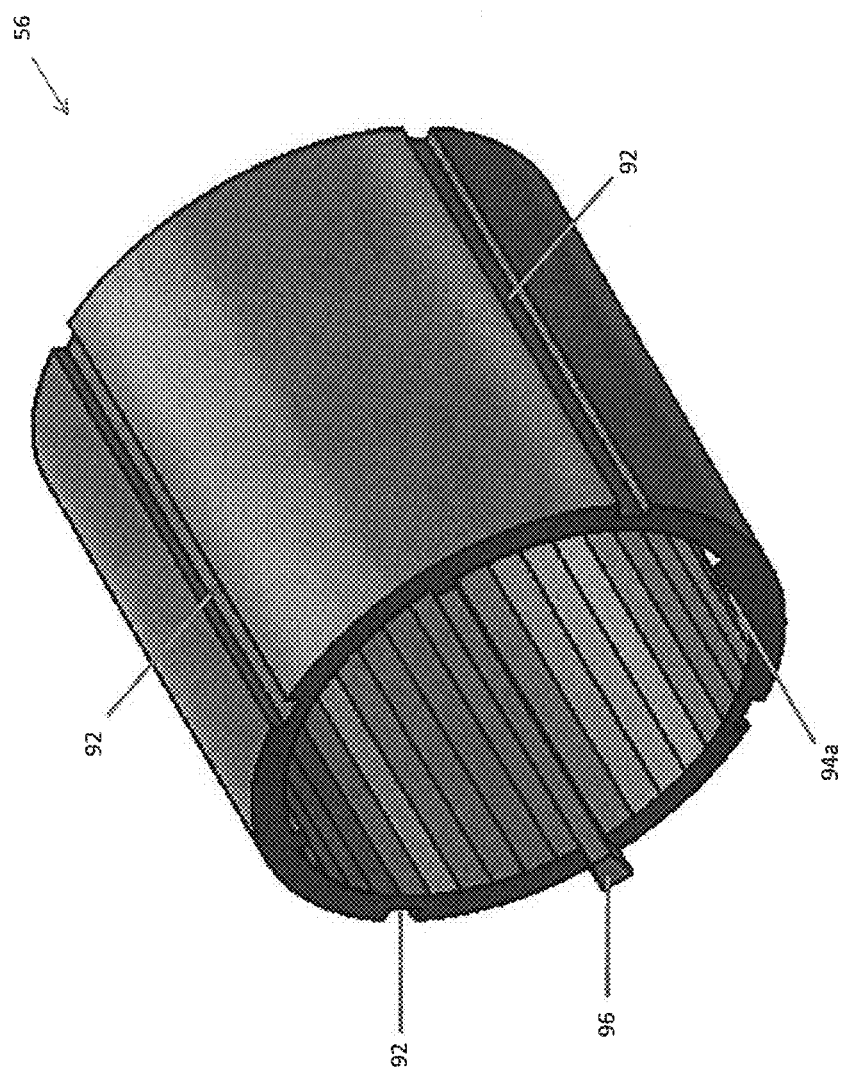
FIG. 15 is a perspective view of a sleeve.
Figure 16:
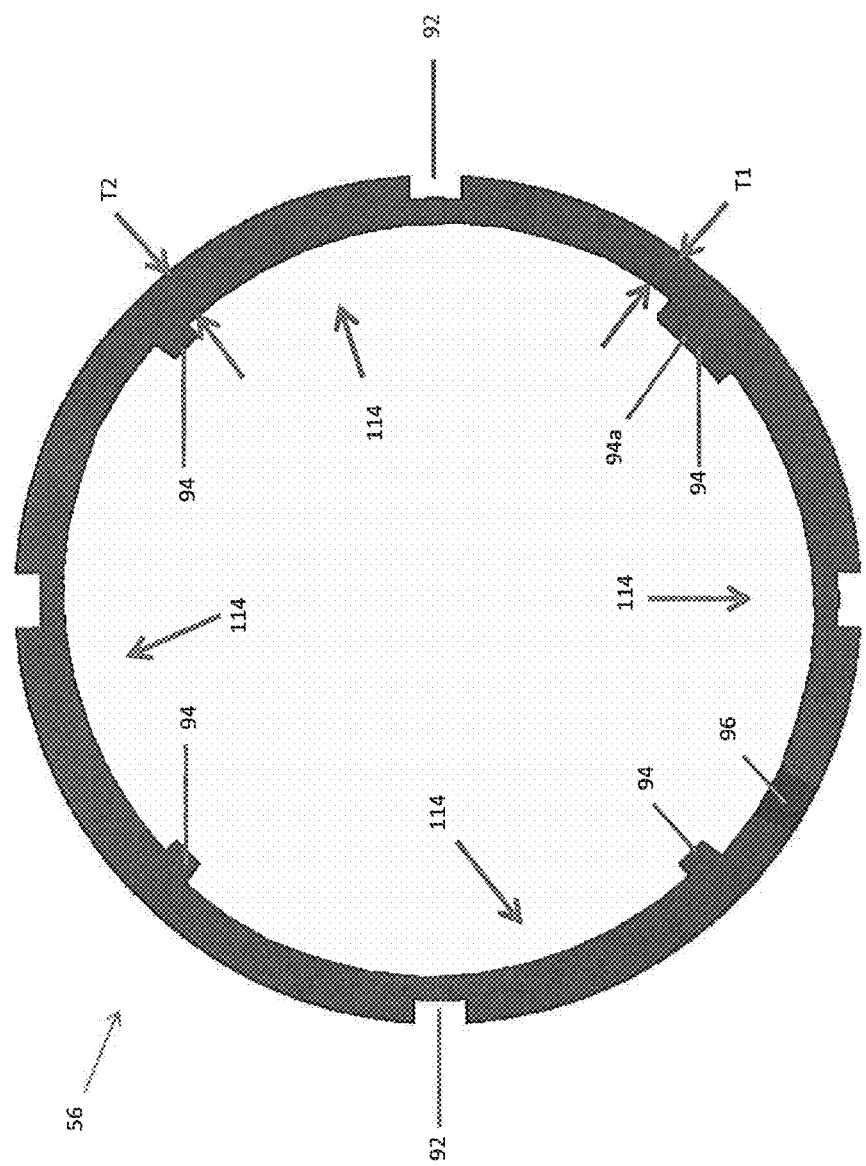
FIG. 16 is an end view of the sleeve shown in FIG. 15.

Referring now to the drawings wherein the showings are for purposes of illustrating embodiments of the invention only and not for purposes of limiting the same, and wherein like reference numerals are understood to refer to like components, FIGS. 1-3 show a pair of poles 10, 12 that can be used with the extendable pole mechanism 50 of this invention. While the extendable pole mechanism 50 is ideally suited for use with paint accessories and the like, such as the paint roller 24 shown in FIG. 1, it is not limited to that application. Pole 10 may have an outside diameter that is received within an inside diameter of pole 12. As a result, pole 10 is slideable within pole 12 (and with respect to pole 12) in first direction 14 and second direction 16. When pole 10 is slid in direction 14, the overall length of both poles is decreased. When pole 10 is slid in direction 16, the overall length of both poles is increased. Thus, a user can adjust the overall length of the poles by sliding pole 10 with respect to pole 12. Pole 10 may have a connection site 18 to which a component to be used, such as paint roller 24, can be attached. FIGS. 4 and 5 show pole 12 which may also have a connection site 20 for purposes to be discussed below. The connection site 20 may be a groove having a substantially circular shape in the mid-section, as shown. The connection site 20 may include two similar grooves on opposite sides of the pole 12, also shown. FIGS. 6 and 7 show pole 10 which may have a groove 22 for purposes to be discussed below. The groove 22 may be on an outer surface of the pole 10 and may extend the entire length of the pole 10, as shown. Pole 12 and/or the collar may serve as a handle for the user. In one specific embodiment, pole 10 is made of aluminum and pole 12 is made of fiberglass to provide good performance.

With reference now to FIGS. 1-3, the extendable pole mechanism 50 may be adjusted between a use condition, where pole 10 is held in a fixed position with respect to pole 12, and an adjustment condition, where pole 10 can be slid with respect to pole 12 so that the overall length can be changed. The extendable pole mechanism 50 may include a collar 52, a roller cage 54, a sleeve 56, and a roller housing 58. These components will now be described in more detail.

With reference now to FIGS. 1-3 and 8-12, the collar 52 may be a generally cylindrical shaped component having an open longitudinal center. The collar 52 may have first and second portions 60, 62 that receive portions of poles 12 and 14, as shown, and may be attached to each other using connectors (not shown) received in openings 64. While four threaded connectors are used in the embodiment shown, the number and type can be any chosen with the sound judgment of a person of skill in the art. The first and second housing portions 60, 62 may include internal extensions 66 that extend radially and have inner surfaces that receive/contact the outer surface of pole 12 and internal extensions 68 that extend radially and have inner surfaces that receive/contact the outer surface of pole 10. Because the pole 12 has a greater outside diameter than pole 10, the extensions 68 extend radially farther than extensions 66. The extensions 68 thus also serve to limit the longitudinal position of the pole 12, as shown in FIG. 3. Note, as seen especially in FIGS. 2 and 11-12, that a portion of the extension 68 may be longitudinally set-back defining a passage 86 that extends over an angular portion of the extension 68. For the embodiment shown, the passage 86 extends about 90 angular degrees. In another embodiment, the passage 86 extends not more than 90 angular degrees. In another embodiment, the passage 86 extends not more than 80 angular degrees. In another embodiment, the passage 86 extends not more than 70 angular degrees. in another embodiment, the passage 86 extends not more than 60 angular degrees. In another embodiment, the passage 86 extends not more than 50 angular degrees. In another embodiment, the passage 86 extends not more than 40 angular degrees. The smaller the passage 86, the less motion required by the user to adjust the extendable pole mechanism 50. The first and second portions 60, 62 may also have a lip 70 and channel 84 at one end and pole extensions 72, 74 for purposes to be discussed below. Note that pole extension 74 may include a first portion 76 that extends longitudinally and second portions 78, 78 positioned on opposite sides of the first portion 76 and that do not extend radially inward as far as the first portion 76. The collar 52 may be formed of any material chosen with the sound judgment of a person of skill in the art.

With reference now to FIGS. 2-3 and 13-14, the roller cage 54 may be a generally cylindrical shaped component having an open longitudinal center. The roller cage 54 may have slots 80 that may extend longitudinally, as shown. Roller pins 82 may be positioned in the slots 80, as shown in FIG. 20. The pins 82 may be cylindrical and formed of a metal. While the roller cage 54 shown has four slots 80 that receive four roller pins 82, any appropriate number may be used. The roller cage 54 may serve as a guide for the roller pins 82 and may "float" between the sleeve 56 and the pole 10. A pair of tensioning forks 88 may extend circumferentially in channels and have tips 90 that abut the corresponding slot 80. The tensioning forks 88 may contact the corresponding pins 82 to help maintain constant contact between the pins 82 and the pole 10 during adjustment—especially in cases where the pins 82 are not in contact with the sleeve 56. The roller cage 54 may be formed of any material chosen with the sound judgment of a person of skill in the art.

With reference now to FIGS. 2-3 and 15-16, the sleeve 56 may be a generally cylindrical shaped component having an open longitudinal center. The sleeve 56 may have slots 92 on its outer surface and extensions 94 that extend radially inward from its inner surface, as shown. While four slots 92 and four extensions 94 are shown, any number, size and style of slots and extensions chosen with the sound judgment of a person of skill in the art may be used. Note that one of the extensions, labeled 94a, may have a larger width than the others. Note also that another extension 96, labeled in FIGS. 3 and 15, may extend longitudinally, as shown. Between at least two of the extensions 94, as labeled in FIG. 16, the width of the sleeve 56 may taper from a relatively thinner portion T1 to a relatively thicker portion T2. This thickness taper creates a ramp 114, as will be discussed further below. For the embodiment shown, a ramp 114 is provided between each of the extensions 94, as shown. The sleeve 56 may be formed of any material chosen with the sound judgment of a person of skill in the art.

With reference now to FIGS. 1-3 and 17-19, the roller housing 58 may be a generally cylindrical shaped component having an open longitudinal center. The roller housing 58 may have extensions 98 that extend radially inwardly from an inner surface of the roller housing 58. The roller housing 58 may also have a lip 100 and channel 102 at one end, as shown. Indicia 104 may be positioned on the outer surface of the roller housing 58. The indicia 104 may include one or more arrows 106 that indicate the directions that the roller housing 58 may be rotated and one or more status indicators 108 that indicate the status of the extendable pole mechanism. For the embodiment shown, the status indicators 108 include at least one lock indicator 110 and at least one un-lock indicator 112. The specific lock indicator 110 shown is a symbol of a locked padlock and the specific un-lock indicator 112 is a symbol of an unlocked padlock. Other symbols may be used. The roller housing 58 may be formed of any material chosen with the sound judgment of a person of skill in the art.

Figure 18:
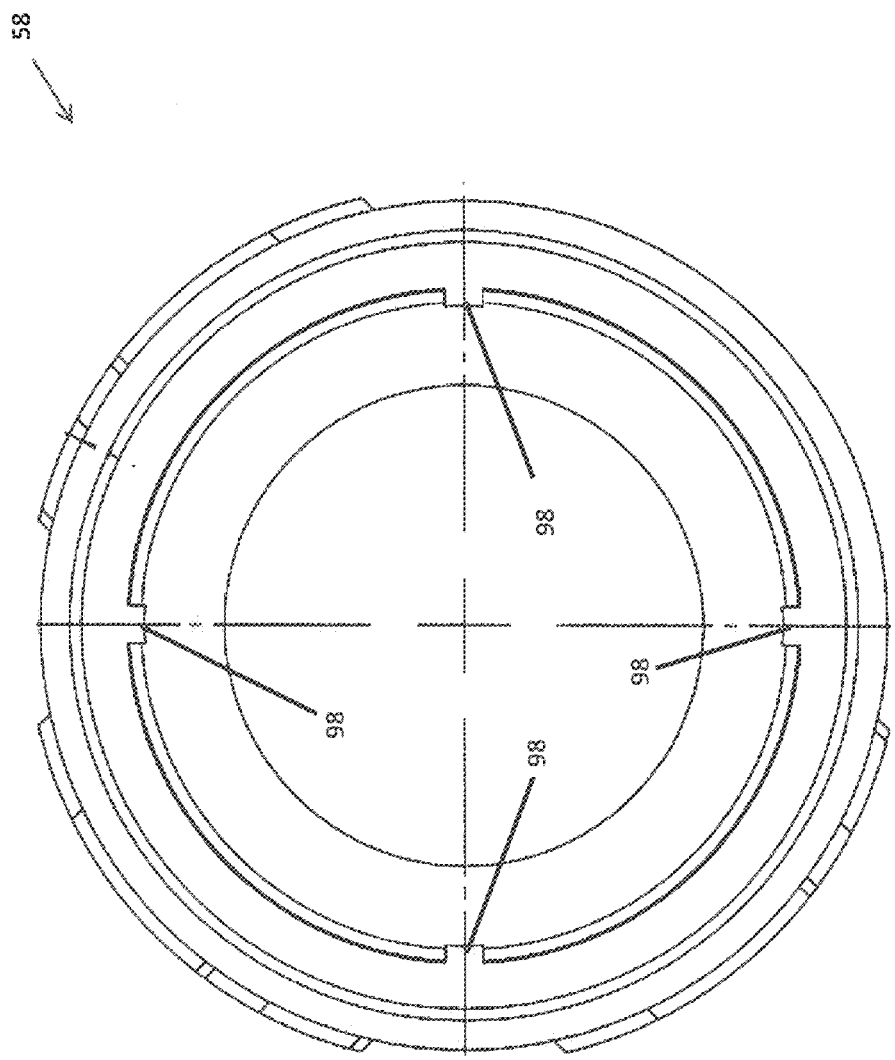
FIG. 18 is an end view of the roller housing shown in FIG. 17.
Figure 19:
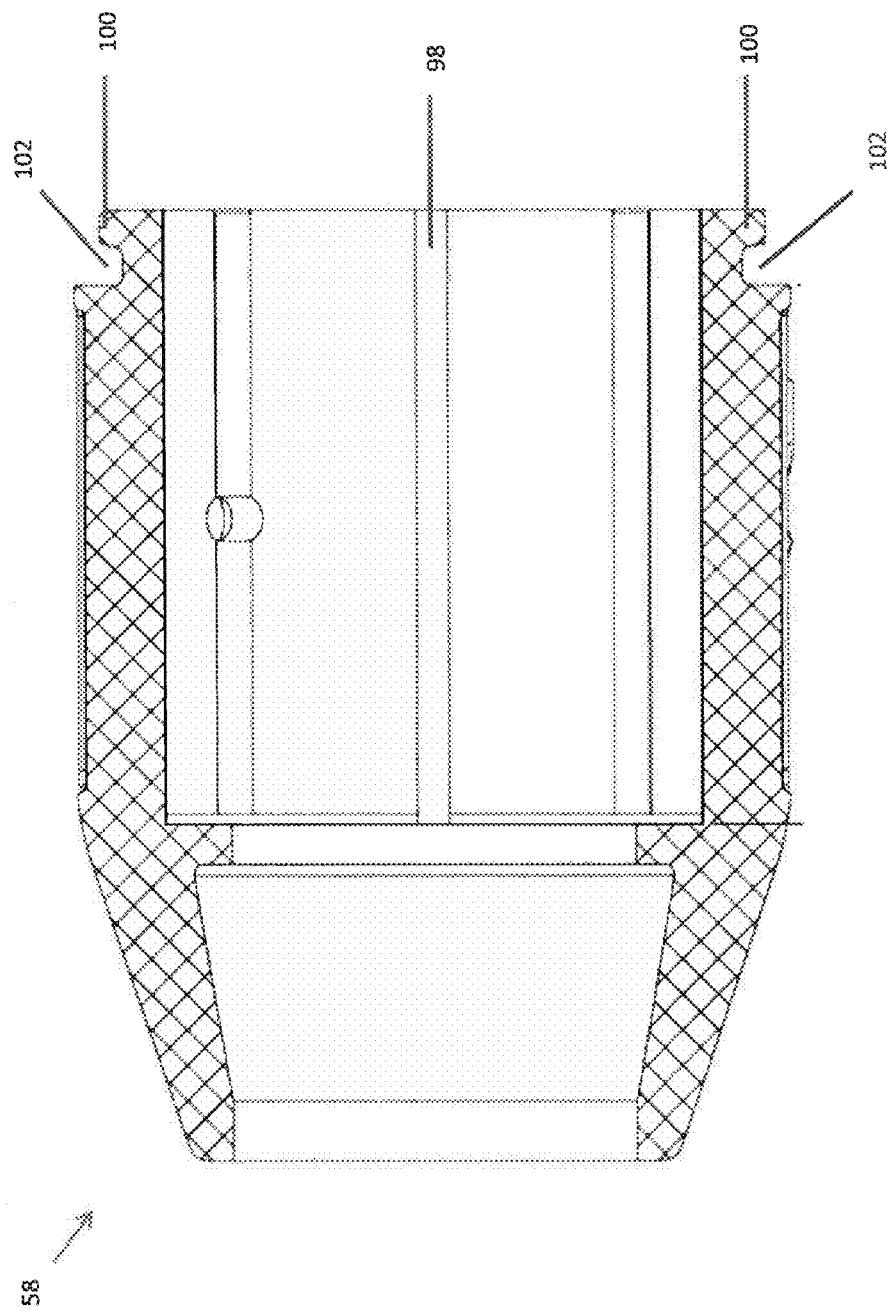
FIG. 19 is a side sectional side view of the roller housing shown in FIG. 17.

With reference to all the FIGURES, but especially FIG. 20, the assembly of the extendable pole mechanism 50 will now be described. The roller cage 54 with rollers 82 is inserted within (received within) the open longitudinal center of the sleeve 56, with each roller 82 positioned between two extensions 94, as shown. The sleeve 56 is inserted within (received within) the open longitudinal center of the roller housing 58. In one specific embodiment, the extension 98 on the roller housing 58, see FIGS. 18-19, are received in the slots 92 formed on the sleeve 56 to attach the components together. This may create a press fit between the sleeve 56 and the roller housing 58. In another embodiment, the sleeve 56 and roller housing 58 may be a single component. Thus, the term "roller sleeve" is hereby used to indicate both the embodiment where the sleeve and roller housing are separate components and the embodiment where they are combined into a single component. To attach the collar 52 to the roller housing 58, the lips 70, 100 of one are received in channels 102, 84 of the other, as shown in FIG. 3. Note that the extension 96 on the sleeve 56, see FIGS. 3 and 15, may be inserted within the passage 86 formed on the collar 52. The poles 10, 12 may be received in the collar portions 60, 62 and within the roller housing 58 as shown in FIGS. 2 and 3. To maintain the pole 12 in a relatively fixed position with respect to the collar 52, unable to move substantially longitudinally or rotatably, the pole extension 72 formed on the first collar portion 60, see FIGS. 8 and 10, may be received in the connection site 20 of the pole 12 on one side, see FIGS. 4-5. This connection is shown in FIG. 3. To prevent the pole 10 from moving rotatably but permitting it to move longitudinally, the pole extension 74 formed on the second collar portion 62, see FIGS. 11 and 12, may extend into the other connection site 20 of the pole 12 with the first portion 76 extending through the connection site 20 and into the groove 22 formed on pole 10, see FIGS. 6-7. The second portions 78 of the pole extension 74 may be received only in the connection site 20 as they do not extend farther.

Figure 17:
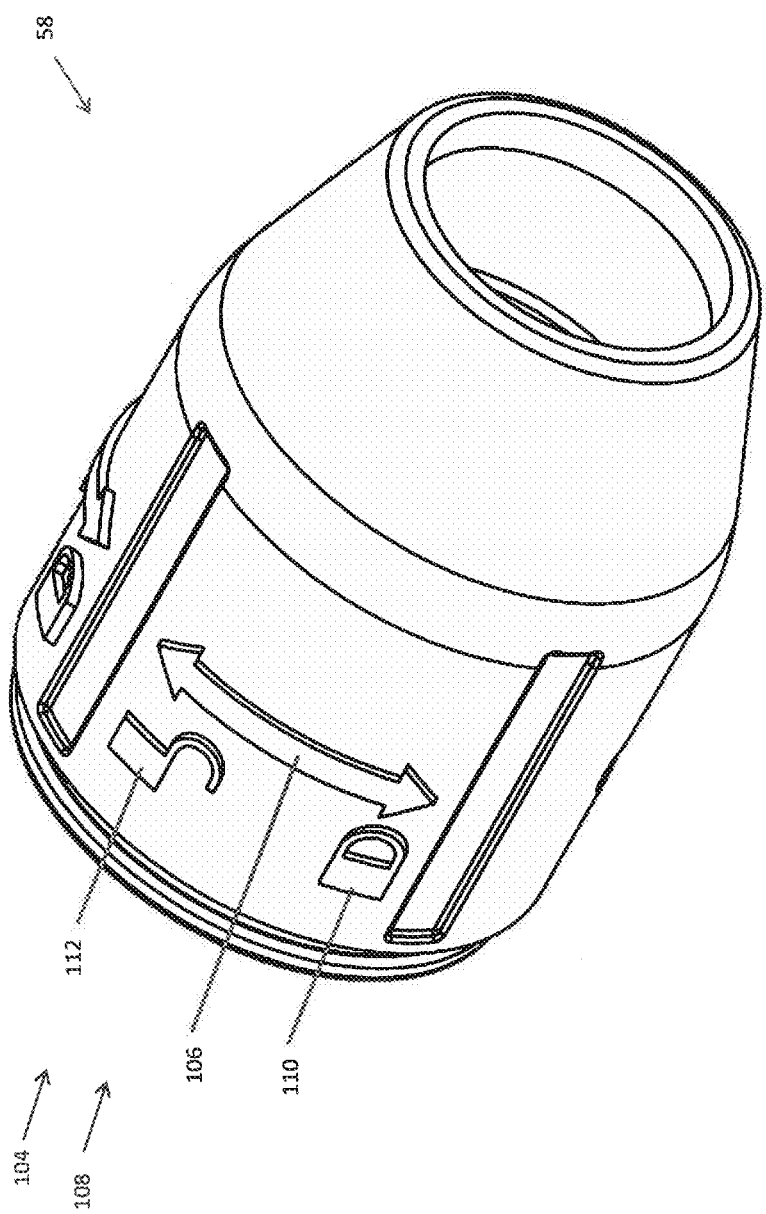
FIG. 17 is a perspective view of a roller housing.

With the extendable pole mechanism 50 assembled as described above, its operation will now be described. The extendable pole mechanism 50 may be adjusted between the use condition, where pole 10 is held in a fixed position with respect to pole 12, and the adjustment condition, where pole 10 can be slid with respect to pole 12 so that the overall length can be changed, simply by rotating the roller housing 58 about its longitudinal axis. When the roller housing 58 is in the locked position, which corresponds to the use condition and occurs when at least one of the rollers 82 is contacting a relatively thicker portion T2 of the sleeve 56, the roller housing 58 need only be rotated in the direction of the arrow 106 toward the un-lock indicator 112, as shown in FIG. 17. As the roller housing 58 rotates, it rotates with respect to the collar 52 and the extension 96 moves within the passage 86. The rotation of the roller housing 58 also causes the sleeve 56 to rotate, causing the rollers 82 to traverse the corresponding sleeve taper, "down" the ramp 114, from the thicker portion T2 toward the thinner portion T1. As a result, this motion loosens the force/grip on the pole 10. In this adjustment condition, it is very easy to adjust the relative positions of the poles 10, 12 by sliding pole 10 with respect to pole 12 to change the overall length. In fact, if the user simply aims the pole 10 toward the ground while holding the collar 52, or roller housing 58, or the pole 12, gravity will easily cause the pole 10 to slide out of the housing 52 and pole 12 (in direction 16 in FIGS. 1-3), increasing the overall length. Similarly, if the user simply aims the pole 10 toward the sky while holding the housing 52 or the pole 12, gravity will easily cause the pole 10 to slide into the housing 52 and pole 12 (in direction 14 in FIGS. 1-3), decreasing the overall length.

To adjust the extendable pole mechanism 50 from the adjustment condition to the use condition, it is only necessary to rotate the roller housing 58 about its longitudinal axis in the direction of the arrow 106 toward the lock indicator 110, as shown in FIG. 17. As the roller housing 58 rotates, it rotates with respect to the collar and the extension 96 moves within the passage 86. The rotation of the roller housing 58 also causes the sleeve 56 to rotate, causing the rollers 82 to traverse the corresponding sleeve taper, "up" the ramp 114, from the thinner portion T1 toward the thicker portion T2. As a result, this motion tightens the force/grip on (clamps) the pole 10, preventing it from moving with respect to the pole 12. The use condition is generally the preferred condition for using the poles while painting, for example. As noted above, for the embodiment shown the passage 86 extends about 90 angular degrees which limits the amount of relative rotation of the roller housing 58 to 90 angular degrees or a "one quarter turn." As also noted above, the angular size of the passage 86 can be varied to thereby vary the limit of available relative rotation and thus the amount of rotation/turn required by the user.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:

1. An extendable pole mechanism for use with a first associated pole that is longitudinally movable with respect to a second associated pole to adjust the overall length of both poles, the extendable pole mechanism comprising:

a collar that: (1) receives the first and second associated poles; and, (2) contacts the second associated pole to prevent substantial relative longitudinal motion of the second pole with respect to the collar;

a roller cage that: (1) has at least one roller; (2) receives the first associated pole; and, (3) is rotatable with respect to the first associated pole;

a roller sleeve that: (1) receives the roller cage; (2) is rotatable with respect to the roller cage; (3) is attached to the collar; and, (4) is rotatable with respect to the collar; and, wherein the extendable pole mechanism is adjustable by rotating the roller sleeve with respect to the collar and with respect to the roller cage between: (1) a use condition where the first associated pole is held by contact with the at least one roller in a longitudinally substantially fixed position with respect to the second associated pole; and, (2) an adjustment condition where: (a) the first associated pole is not held by contact with the at least one roller in a longitudinally substantially fixed position with respect to the second associated pole; and, (b) the first associated pole is longitudinally moveable with respect to the second associated pole.

2. The extendable pole mechanism of claim 1 wherein:
the collar has an open longitudinal center that receives the first and second associated poles;
the roller cage has an open longitudinal center that receives the first associated pole; and,
the roller sleeve has an open longitudinal center that receives the roller cage.

3. The extendable pole mechanism of claim 1 wherein:
the roller sleeve has an extension; and,
the collar has a passage that receives the roller sleeve extension to limit the amount of relative rotation of the roller sleeve with respect to the collar when the extendable pole mechanism is adjusted between the use condition and the adjustment condition.

4. The extendable pole mechanism of claim 3 wherein:
the roller sleeve extension extends longitudinally; and,
the collar passage extends not more than 90 angular degrees to limit the amount of relative rotation of the roller sleeve with respect to the collar to not more than 90 angular degrees.

5. The extendable pole mechanism of claim 1 wherein:
a groove is formed on an outer surface of the first associated pole;
a groove is formed on an outer surface of the second associated pole;
the collar comprises a pole extension that extends through the groove formed on the second associated pole and into the groove formed on the first associated pole to prevent the first associated pole from substantial relative rotational motion with respect to the collar.

6. The extendable pole mechanism of claim 1 wherein:
the roller is a cylindrical roller pin; and,
the roller cage comprises: an opening that receives the roller pin; and, at least one tensioning fork having a tip that abuts the opening and contacts the roller pin to maintain constant contact between the roller pin and the first associated pole.

7. The extendable pole mechanism of claim 1 wherein:
the roller sleeve comprises a ramp;
the at least one roller rolls along the ramp as the roller sleeve is rotated with respect to the roller cage in a first direction to tighten a force between the roller and the first associated pole to adjust the extendable pole mechanism into the use condition; and,
the at least one roller rolls along the ramp as the roller sleeve is rotated with respect to the roller cage in a second direction to loosen the force between the roller and the first associated pole to adjust the extendable pole mechanism into the adjustment condition.

8. The extendable pole mechanism of claim 1 wherein:
first indicia are positioned on an outer surface of the roller sleeve to indicate directions that the roller sleeve may be rotated with respect to the collar; and,
second indicia are positioned on the outer surface of the roller sleeve to indicate the status of the extendable pole mechanism; the second indicia comprising a lock indicator and an un-lock. indicator.

9. The extendable pole mechanism of claim 1 wherein the roller sleeve comprises:
a sleeve that receives the roller cage;
a roller housing that receives the sleeve; and,
an extension formed on one of the sleeve and the roller housing that is received in an extension on the other of the sleeve and the roller housing to attach the sleeve to the roller housing.

10. A method comprising the steps of:
(A) providing a first pole that is longitudinally movable with respect to a second pole to adjust the overall length of both poles;
(B) providing an extendable pole mechanism comprising: (a) a collar that: (1) receives the first and second associated poles; and, (2) contacts the second associated pole to prevent substantial relative longitudinal motion of the second pole with respect to the collar; (b) a roller cage that: (1) has at least one roller; (2) receives the first associated pole; and, (3) is rotatable with respect to the first associated pole; and, (c) a roller sleeve that: (1) receives the roller cage; (2) is rotatable with respect to the roller cage; (3) is attached to the collar; and, (4) is rotatable with respect to the collar; and,
(C) adjusting the extendable pole mechanism, by rotating the roller sleeve with respect to the collar and with respect to the roller cage, between: (1) a use condition where the first pole is held by contact with the at least one roller in a longitudinally substantially fixed position with respect to the second pole; and, (2) an adjustment condition where: (a) the first pole is not held by contact with the at least one roller in a longitudinally substantially fixed position with respect to the second pole; and, (b) the first pole is longitudinally moveable with respect to the second associated pole.

11. The method of claim 10 wherein:
step (B) comprises the steps of: providing the roller sleeve with an extension; and, providing the collar with a passage that receives the roller sleeve extension; and,
step (C) comprises the step of: using the roller sleeve extension within the collar passage to limit the amount of relative rotation of the roller sleeve with respect to the collar when the extendable pole mechanism is adjusted between the use condition and the adjustment condition.

12. The method of claim 11 wherein step (C) comprises the step of:
limiting the amount of relative rotation of the roller sleeve with respect to the collar to not more than 90 angular degrees.

13. The method of claim 10 wherein:
step (B) comprises the step of: providing the roller sleeve with a ramp; and,
step (C) comprises the steps of: rolling the at least one roller along the ramp as the roller sleeve is rotated with respect to the roller cage in a first direction to tighten a force between the roller and the first pole to adjust the extendable pole mechanism into the use condition; and, rolling the at least one roller along the ramp as the roller sleeve is rotated with respect to the roller cage in a second direction to loosen the force between the roller and the first associated pole to adjust the extendable pole mechanism into the adjustment condition.

14. The method of claim 10 wherein:
step (A) comprises the step of: providing a groove on an outer surface of the first pole; and, providing a groove on an outer surface of the second pole;
step (B) comprises the step of: providing the collar with a pole extension that extends through the groove formed on the second pole and into the groove formed on the first pole; and,
step (C) comprises the step of: using the pole extension that extends through the groove formed on the second pole and into the groove formed on the first pole to prevent the first pole from substantial relative rotational motion with respect to the collar.

15. The method of claim 10 wherein:
step (B) comprises the step of; providing the roller to be a cylindrical roller pin; and, providing the roller cage with an opening that receives the roller pin and at least one tensioning fork having a tip that abuts the opening; and,
step (C) comprises the step of: contacting the roller pin with the tensioning fork to maintain constant contact between the roller pin and the first pole.

16. An extendable pole mechanism comprising:
a first pole and a second pole, wherein the first pole is longitudinally movable with respect to the second pole to adjust the overall length of both poles;
a collar that: (1) has an open longitudinal center that receives the first and second poles; and, (2) contacts the second pole to prevent substantial relative longitudinal motion of the second pole with respect to the collar;
a roller cage that: (1) has at least one roller; (2) has an open longitudinal center that receives the first pole; and, (3) is rotatable with respect to the first pole;
a roller sleeve that; (1) has an open longitudinal center that receives the roller cage; (2) is rotatable with respect to the roller cage; (3) is attached to the collar; (4) comprises a ramp; and, (5) is rotatable with respect to the collar;
wherein the extendable pole mechanism is adjustable by rotating the roller sleeve with respect to the collar and with respect to the roller cage between: (1) a use condition where the first pole is held by contact with the at least one roller in a longitudinally substantially fixed position with respect to the second pole; and, (2) an adjustment condition where: (a) the first pole is not held by contact with the at least one roller in a longitudinally substantially fixed position with respect to the second pole; and, (b) the first pole is longitudinally moveable with respect to the second pole;
wherein the at least one roller rolls along the ramp as the roller sleeve is rotated with respect to the roller cage in a first direction to tighten a force between the roller and the first pole to adjust the extendable pole mechanism from the adjustment. condition into the use condition; and,
wherein the at least one roller rolls along the ramp as the roller sleeve is rotated with respect to the roller cage in a second direction that is opposite the first direction to loosen the force between the roller and the first pole to adjust the extendable pole mechanism from the use condition into the adjustment condition.

17. The extendable pole mechanism of claim 16 wherein:
the roller sleeve has an extension; and,
the collar has a passage that receives the roller sleeve extension to limit the amount of relative rotation of the roller sleeve with respect to the collar when the extendable pole mechanism is adjusted between the use condition and the adjustment condition.

18. The extendable pole mechanism of claim 17 wherein:
a groove is formed on an outer surface of the first pole;
a groove is formed on an outer surface of the second pole;
the collar comprises a pole extension that extends through the groove formed on the second pole and into the groove formed on the first pole to prevent the first pole from substantial relative rotational motion with respect to the collar.

19. The extendable pole mechanism of claim 18 wherein:
the roller is a cylindrical roller pin; and,
the roller cage comprises: an opening that receives the roller pin; and, at least one tensioning fork having a tip that abuts the opening and contacts the roller pin to maintain constant contact between the roller pin and the first pole.

20. The extendable pole mechanism of claim 19 wherein:
first indicia are positioned on an outer surface of the roller sleeve to indicate directions that the roller sleeve may be rotated with respect to the collar; and,
second indicia are positioned on the outer surface of the roller sleeve to indicate the status of the extendable pole mechanism; the second indicia comprising a lock indicator and an un-lock indicator.

* * * * *